Feb. 19, 1952　　　　　　　L. M. POTTS　　　　　　2,586,711
SCANNING SYSTEM AND APPARATUS
Original Filed June 4, 1947　　　　　　　　　　　　7 Sheets-Sheet 1
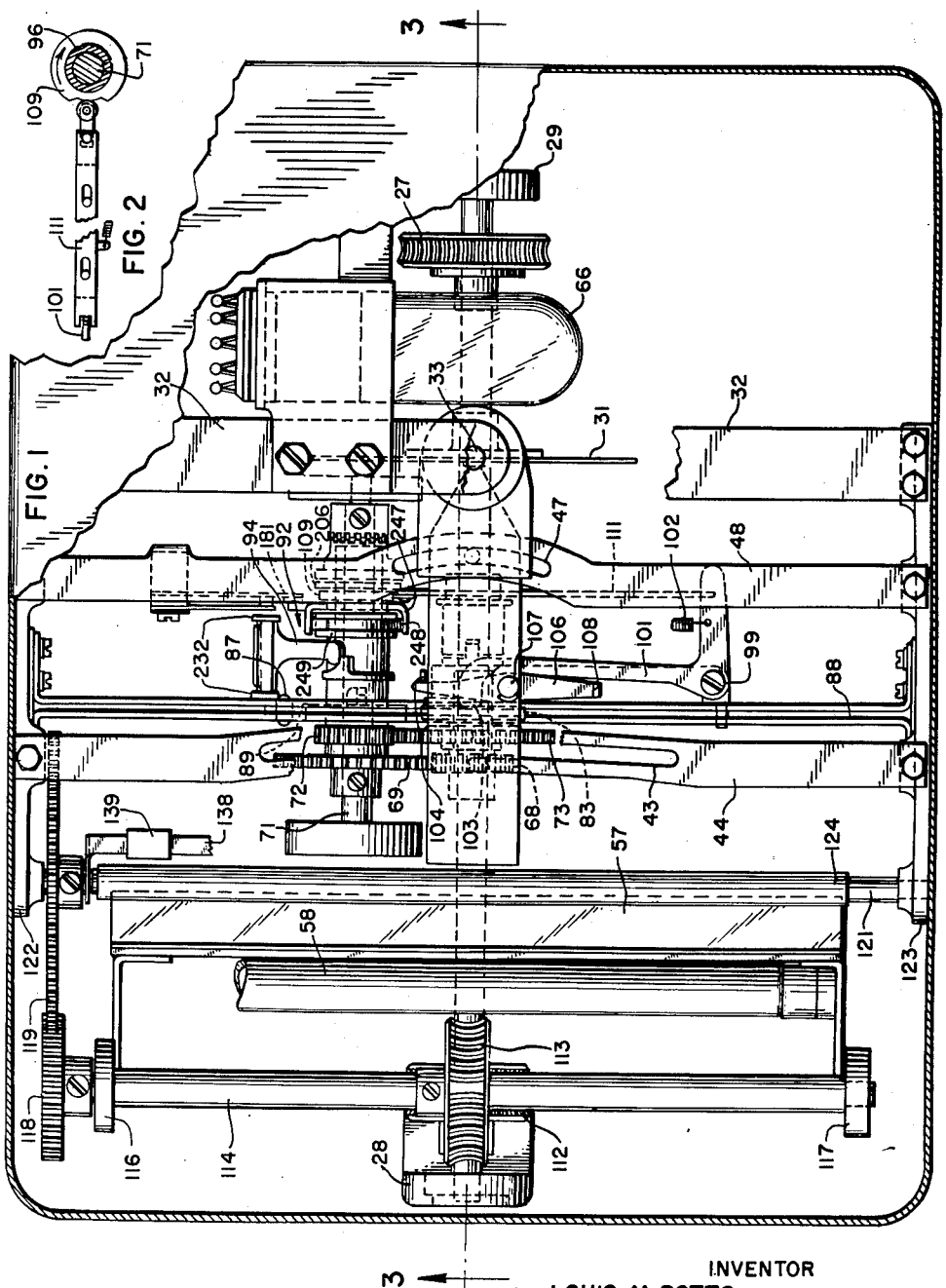
INVENTOR
LOUIS M. POTTS, DECEASED
MARTHA W. C. POTTS, EXECUTRIX
BY
*Emery Robinson*
ATTORNEY

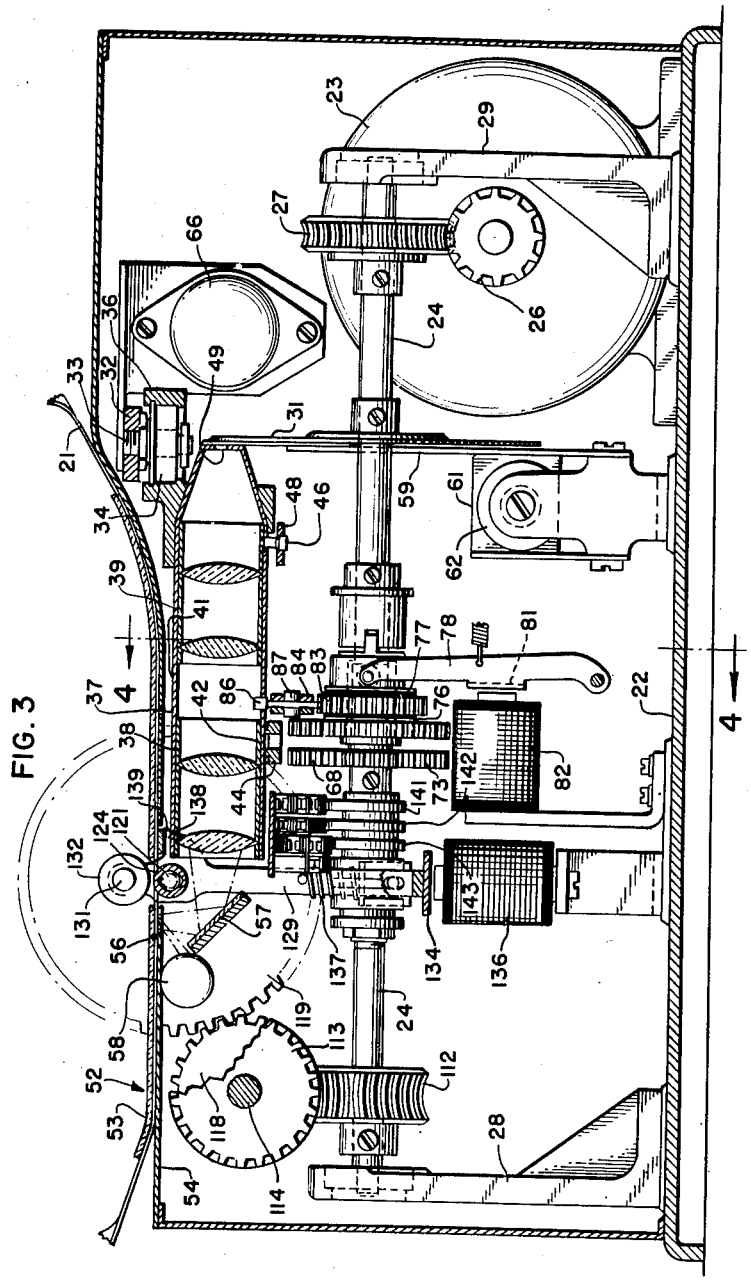

Feb. 19, 1952 L. M. POTTS 2,586,711
SCANNING SYSTEM AND APPARATUS
Original Filed June 4, 1947 7 Sheets-Sheet 3
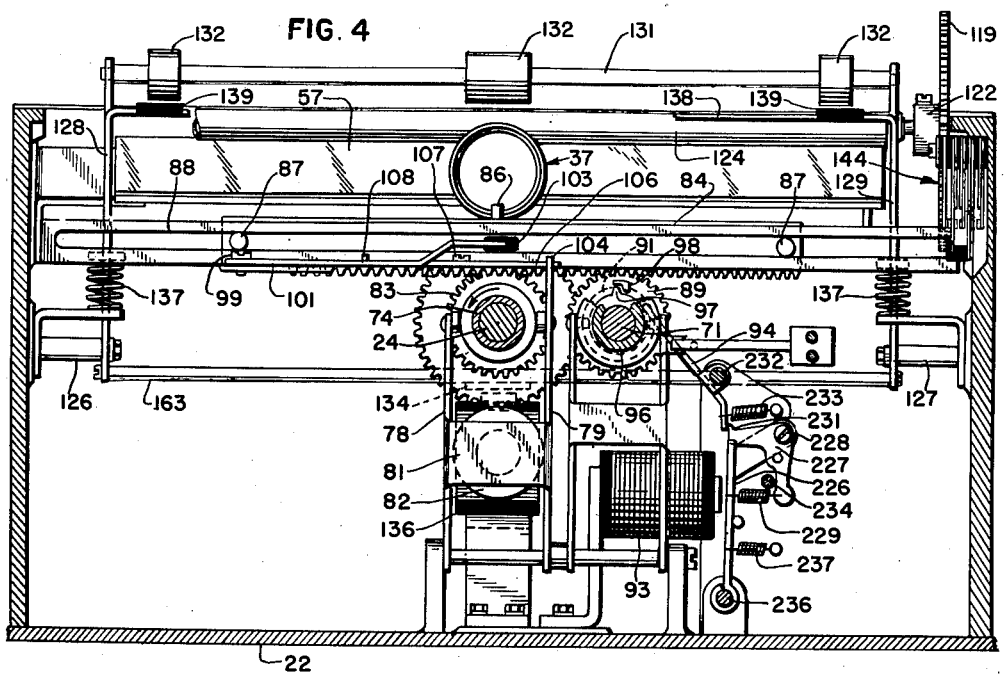
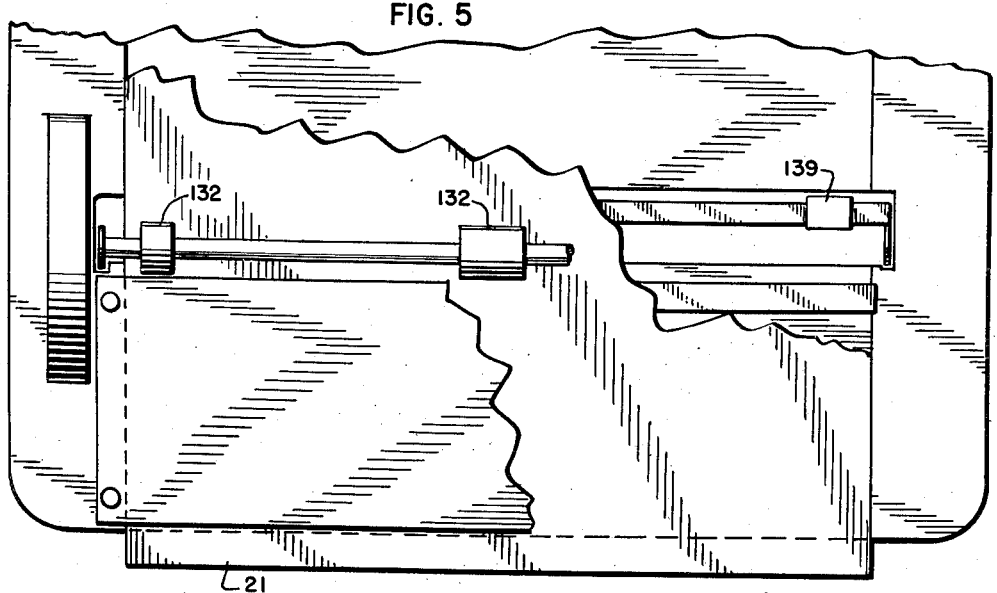
INVENTOR
LOUIS M. POTTS, DECEASED
MARTHA W. C. POTTS, EXECUTRIX
BY
Emery Robinson
ATTORNEY Feb. 19, 1952 L. M. POTTS 2,586,711
SCANNING SYSTEM AND APPARATUS
Original Filed June 4, 1947 7 Sheets-Sheet 4
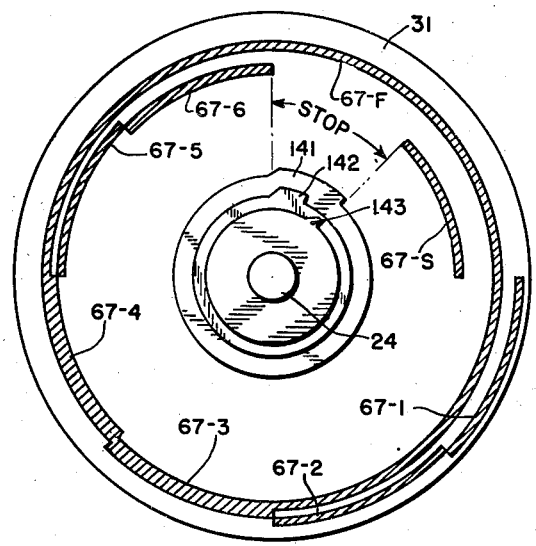
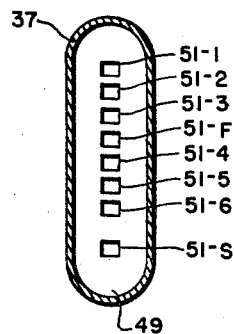
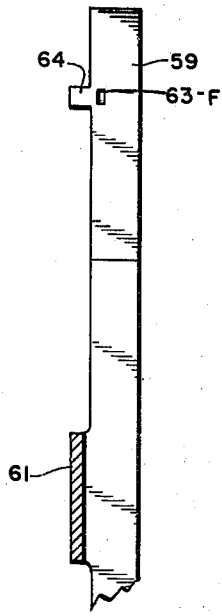
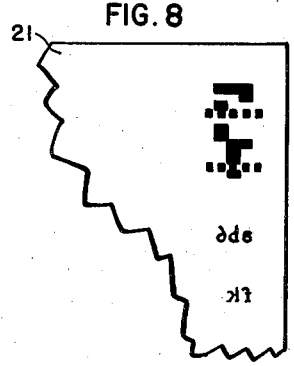
INVENTOR
LOUIS M. POTTS, DECEASED
MARTHA W. C. POTTS, EXECUTRIX
BY
ATTORNEY Feb. 19, 1952     L. M. POTTS     2,586,711
SCANNING SYSTEM AND APPARATUS
Original Filed June 4, 1947     7 Sheets-Sheet 5

INVENTOR
LOUIS M. POTTS, DECEASED
MARTHA W. C. POTTS, EXECUTRIX
BY
*Emery Robinson*
ATTORNEY Feb. 19, 1952     L. M. POTTS     2,586,711
SCANNING SYSTEM AND APPARATUS
Original Filed June 4, 1947     7 Sheets-Sheet 6

INVENTOR
LOUIS M. POTTS, DECEASED
MARTHA W. C. POTTS, EXECUTRIX
BY
Emery Robinson
ATTORNEY

FIG. 15

INVENTOR
LOUIS M. POTTS, DECEASED
MARTHA W. C. POTTS, EXECUTRIX
BY Emery Robinson
ATTORNEY Patented Feb. 19, 1952

2,586,711

UNITED STATES PATENT OFFICE 2,586,711

SCANNING SYSTEM AND APPARATUS

Louis M. Potts, deceased, late of Evanston, Ill., by Martha W. C. Potts, executrix, Evanston, Ill., assignor to Teletype Corporation, Chicago, Ill., a corporation of Delaware Original application June 4, 1947, Serial No. 752,512. Divided and this application November 5, 1948, Serial No. 58,505

20 Claims. (Cl. 178—17)

This invention relates to scanning systems and apparatus, and particularly to systems wherein printing telegraph apparatus is used for recording code marks on a page form and the form is subsequently scanned by a photoelectric transmitter which transmits signals accordingly.

This application is a division of copending application Serial No. 752,512, filed June 4, 1947, now U. S. Patent No. 2,540,287 of February 6, 1951.

An object of the invention is to provide apparatus for scanning from a page form both printed characters and corresponding code marks, and in which the code marks so provided are scanned by a photoelectric transmitter for transmission purposes.

Another object of the invention is to provide photoelectric transmitting apparatus which scans a page form having code marks thereon, line by line, and transmits signals according to the code marks so scanned.

A further object of the invention is to provide a photoelectric transmitter which converts the signal representations of one equal length code into the signal representations of another equal length code with automatically inserted shift signals.

Still another object of the invention is to provide a photoelectric transmitter which automatically transmits a carriage return signal.

A feature of the invention is the use of a traveling projector in a photoelectric transmitter which after completing the scanning of a line of code marks on a page form is automatically returned to its beginning of line position preparatory to scanning the next line of code marks. When the projector reaches the beginning of line position, the page form is advanced to place the next line of code marks in scanning position.

Another feature of the invention is the use of a pivoted projector for scanning control form indicia wherein the focal length of the projector is automatically adjusted according to the area of the form being scanned.

Other objects, features, and advantages of the invention, although not specifically recited above, will become apparent as the invention is later described in detail.

The photoelectric transmitter includes a pivotally mounted projector whose free end moves across a line of code marks reproduced on a page form, stopping at each code combination to transmit the signal and then resuming its travel to the next code combination. When the end of the line is reached, the projector is automatically returned to the beginning of line position as a new line of code marks is fed into scanning position. Sequential transmission of the code impulses and the start-stop impulses by operation of a photoamplifier tube, is obtained by means of a scanning disc. The scanning disc consists of an opaque circular plate having arcuate transparent areas arranged at different radial distances and in different angular positions about the center point. These arcuate areas represent the six elements of the code combination and the stop impulse. A start impulse is a no current impulse and therefore no transparent area is provided in this case, the opacity of the circular plate being relied upon to send the start impulse. The feed marks are scanned by a continuous transparent ring of the scanning disc when a shutter is in one of its two positions, and at this time the code marks are blocked. In its other position, the shutter permits scanning of the code marks and blocks scanning of the feed marks. A suitable circuit arrangement is provided for use with this photoelectric transmitter for the transmission of a six unit code signal.

The invention also provides a modified form of transmitter which converts the six unit code into a five unit code with automatically inserted shift and unshift signals and carriage return signals. However, it should be pointed out that the photoelectric transmitting apparatus disclosed herein, is designed to be used either in the six unit code system, or in the five unit code system. A different circuit arrangement is used in conjunction with the photoelectric transmitter designed to transmit five unit code signals.

In each of the photoelectric transmitters, provision is made should abnormal spacing occur between code mark combinations. When this condition is encountered, the stop impulse between characters is prolonged and thus no detrimental results will occur at the receiving end of the line since in start-stop telegraph practice the receiving cam sleeve would be held in its stop position until a start impulse is received. The transmission of the code combination of the abnormally spaced characters is in this way delayed but is transmitted intact without impairing transmission.

A more ready comprehension of the invention may be had by reference to the following detailed description when read in conjunction with the drawings wherein:

Fig. 1 is a plan view of the photoelectric transmitting apparatus with parts broken away and parts omitted to avoid confusion in the drawings;

Fig. 2 is a detail of a braking mechanism which forms part of the photoelectric transmitter;

Fig. 3 is a section view of the photoelectric transmitter taken on the line 3—3 of Fig. 1;

Fig. 4 is a section view of the transmitting apparatus taken on the line 4—4 of Fig. 3;

Fig. 5 is a partial plan view of the transmitting apparatus devoted particularly to the feeding of the page form;

Fig. 6 is a detailed view of the scanning disc used in connection with transmission of a six unit code;

Fig. 8 is a rear view of a page form illustrating printed code mark combinations and feed marks;

Fig. 10 is an enlarged detail view of the end of the projector used for six unit code transmission particularly for the purpose of showing the code mark and feed mark openings;

Fig. 12 is a detail of the shutter used for six unit code transmission;

Fig. 15 is a circuit arrangement used for five unit code transmission.

Figure 7:
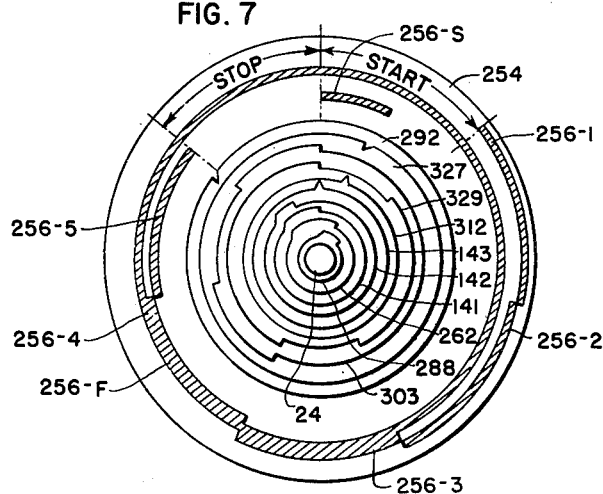
Fig. 7 is a detailed view of the scanning disc used in connection with transmission of a five unit code.
Figure 11:
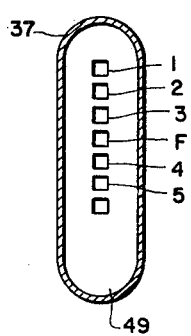
Fig. 11 is an enlarged detail view of the end of the projector used for five unit code transmission particularly for the purpose of showing the code mark and feed mark openings.
Figure 13:
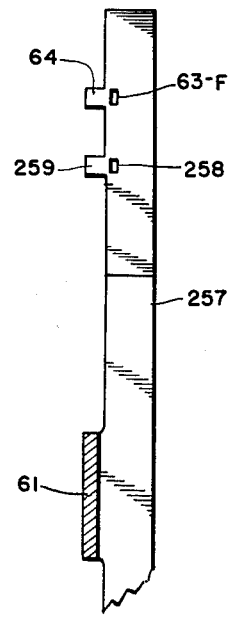
Fig. 13 is a detail of the shutter used for five unit code transmission.
Figure 9:
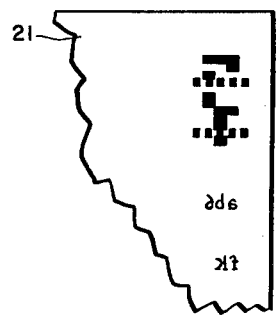
Fig. 9 is a view identical with that shown in Fig. 8 and duplicated for convenience in reading the specification.

The prepared coded page utilized in the present invention may be prepared by the apparatus disclosed in copending application Serial No. 752,512, filed on June 4, 1947, in the name of L. M. Potts, or by any other known and suitable means.

Referring now particularly to Figs. 1 to 13, the photoelectric transmitting apparatus provided in the present invention will be described. A pictorial representation of a portion of the rear of a page form 21 to be scanned by the photoelectric transmitter is shown in Fig. 8 with the code marks appearing thereon corresponding to related characters appearing on the front of the page form. Numeral 22 represents the base of the apparatus upon which is mounted a motor 23 for providing rotary movement of main shaft 24 by means of gears 26 and 27. Shaft 24 is journaled on the upright supports 28 and 29 and has fixedly attached thereto a scanning disc 31, shown in detail in Fig. 6.

Extending across the top of the apparatus is a cross support 32 into which is threaded a downwardly extending pivot stud 33. Supported about pivot stud 33 is a ball bearing 34 encased in a member 36 which is rigidly secured to the oscillating projector generally indicated as numeral 37. Projector 37 includes two separate lens carrying elements 38 and 39, each movable in the cylindrical or tube portion 41 of the projector. Upon oscillation of the projector, as will later be described, sliding movement of lens element 38 is produced by reason of the engagement of a pin 42 carried thereby in a slot 43 of a cross piece 44. Sliding movement of lens element 39 is similarly produced by engagement of pin 46 in slot 47 of crosspiece 48. It is to be understood that the tube portion 41 of the projector, at the places where engaged by pins 42, 46, will be provided with suitable clearances to permit the sliding movement of elements 38 and 39. Because of the construction just described above, the focal length of the projector 37 may be varied according to the area of the page form 21 being scanned as will later become more apparent.

One end of the projector 37 is covered by a plate 49 having openings 51—1 to 51—6, 51—F (Fig. 10) and an opening 51-S which are adjacent to the scanning disc 31. The openings just mentioned are made narrower than the image received therethrough so that when a code mark or a feed mark is scanned it will completely cover the opening to which it is related. This further allows a slight misalignment between the projector 37 and the code marks of page form 21.

At the top of the apparatus is a guideway 52 composed of a guiding plate 53 and the top plate 54 of the apparatus. Plate 53 is of transparent material to allow viewing of the printed characters on the page form. Plate 54 is slotted at 56 so as to expose one line of code marks to a suitably mounted mirror 57. Light for the optical system is provided by a fluorescent lamp 58 extending across the apparatus at the top of the mirror 57. Mounted between plate 49 of projector 37 and scanning disc 31 is a thin opaque shutter 59 shown in detail in Fig. 12 which is mounted on an armature 61 of a magnet 62. Shutter 59 is movable to two different positions as will later appear. In one position it will permit the passage of light for scanning purposes through feed hole opening 63-F formed thereon, from opening 51-F of plate 49 and at this time block all of the openings 51—1 to 51—6 and 51-S. In the other position, projection 64 of shutter 59 is interposed in front of feed hole opening 51-S and all the code mark openings are unblocked for scanning purposes.

With reference now to Fig. 6, the scanning disc 31 will be described in more detail. Its purpose is to selectively control the passage of light to a photoamplifier tube 66 suitably mounted in the apparatus. Scanning disc 31 consists of an opaque circular plate having arcuate transparent areas 67—1 to 67—6, progressively arranged about the center point at different radial positions which are in line with corresponding openings in plate 49 of projector 37. In addition, an arcuate transparent area 67-S is provided for the start impulse while a continuous transparent ring 67-F is provided for scanning of the feed mark. The start impulse is provided by painting a line the same color as the page form across the underneath part of plate 54 adjacent the slot 56. No arcuate transparent area is provided for the stop impulse since this corresponds to a marking impulse and at this time an opaque portion of disc 31 which lies between areas 67—6 and 67-S will be presented in scanning position with respect to photoamplifier tube 66.

The mechanism for moving the free end of the projector 37 back and forth across the apparatus for scanning purposes will now be explained. Fast to main shaft 24 is a gear 68 which is in mesh with a gear 69 carried by a second shaft 71. The latter shaft has fixed thereto a gear 72 in mesh with a gear 73 rotatably mounted about shaft 24 on sleeve 74. Friction washer 76, 77 operable by arms 78 and 79 of armature 81 of magnet 82 act as a clutch to enable the rotation of a gear 82 with the gear 73. The previously described gearing provides a speed reduction for the gear 83. Gear 83 is in mesh with a rack 84 which is suitably connected to projector 37 by means of a pin 86. Thus, when clutch magnet 82 is periodically energized, gear 83 will drive the rack 84 to the left as viewed in Fig. 4, causing the projector 37 to move also periodically to the left to scan a line of code marks as will hereafter appear. Rack 84 is provided with rollers 87 which ride in the slotted guideway 88. For returning the projector 37 to the beginning of line position, a gear 89 is provided which is also in mesh with the rack 84 and is carried rotatably about the shaft 71 on a sleeve 91. When gear 83 drives rack 84, gear 89 moves idly about the shaft 71 in a counter-clockwise direction. Return movement of gear 89 is under the control of a single revolution clutch indicated generally at 92 the operation of which is governed by a clutch magnet 93 in a manner well known in the art. Stop arm 94 is operable under the control of armature 96 of clutch magnet 93 as will be later described in detail. When the clutch 92 is released sleeve 96 rotates until a lug 97 carried thereby engages a lug 98 carried by the gear 89. When this occurs, gear 89 will rotate in a clockwise direction and drive rack 84 back to its beginning of line position. The length of the previous line scanned determines at what point lug 97 will engage lug 98. It is apparent that when gear 83 drives the rack 84, gear 89 will also be rotated and lug 98 will move away from lug 97.

Suitably pivoted at 99 in the apparatus is a brake 101, urged in a counterclockwise direction (Fig. 1) by means of a spring 102, and carrying brake material 103 which presses against the side of rack 84 through the opening in guideway 88. Arm 79 of armature 81 has an extension 104 which operates against one end of a lever 106 pivoted at 107, causing a projection 108 carried at its other end to operate against brake 101 and free it from rack 84 when clutch magnet 82 is energized. At this time gear 89 may drive rack 84 to the left as shown in Fig. 4. When the projector unit is being returned to the beginning of line position, clutch magnet 93 will operate and sleeve 96 will be released for rotation as explained. Sleeve 96 carries a cam 109 which operates a follower slide lever 111, which by pushing against the shorter arm of brake 101, also frees the brake so that gear 89 may be permitted to drive rack 84 to the beginning of the line position. Just before this position is reached cam 109 operates lever 111 and permits brake 101 to move to its braking position preventing the optical unit from being jarred or rebounding. It is apparent then, as rack 84 is operated, projector 37 will be pivoted and lens sections 38, 39 will slide in the tube 41 to automatically adjust the focal length of the projector according to the area of the page form being scanned.

A description of the page form feeding mechanism will now be given. On shaft 24 is rigidly attached a gear 112 which is in mesh with a gear 113 carried on a shaft 114 journaled on supports 116 and 117. At one end, shaft 114 has secured thereto a small gear 118 which is in mesh with a large gear 119 mounted on a shaft 121. Shaft 121 is mounted in bearings 122 and 123 and supports the paper feed roll 124 which is constantly rotated through the just described gearing arrangement. Mounted for vertical sliding movement at either side of the apparatus on brackets 126 and 127 are members 128 and 129 which support at their upper ends a pressure roller shaft 131 extending therebetween. Shaft 131 supports the pressure roller 132. The lower ends of members 128 and 129 are connected by a cross rod 133 the middle portion of which has attached thereto an armature 134 which is under the control of a magnet 136. Compression springs 137 normally urge members 128 and 129 to an upward position so that pressure roller 132 is free of constantly rotating feed roll 124 and no feeding of the page form takes place. At this time a brake member 138 also supported from members 128 and 129 and having brake material 139 holds the paper from movement against the upper guideway 53 as is shown clearly in Fig. 3. However, when armature 134 is attracted upon energization of magnet 136 members 128 and 129 are pulled down against the tension of springs 137, freeing brake member 138 from the page form and enabling pressure rollers 132 to force the page form 21 against feed roll 124. At this time the page form is fed forward as will more readily hereinafter appear in connection with the description of the circuit arrangements.

Before a description of the first circuit arrangement is undertaken, attention is called to switch cams 141, 142, and 143 mounted on the constantly rotating shaft 24 of the transmitting apparatus and to contact bank 144 at the right side of Fig. 4. It is to be understood as has been pointed out before, that the apparatus is adapted to be used either for transmission of a six unit code or with some modifications for an arrangement wherein six unit code signals are converted into five unit code signals with automatically inserted shift signals.

Figure 14:
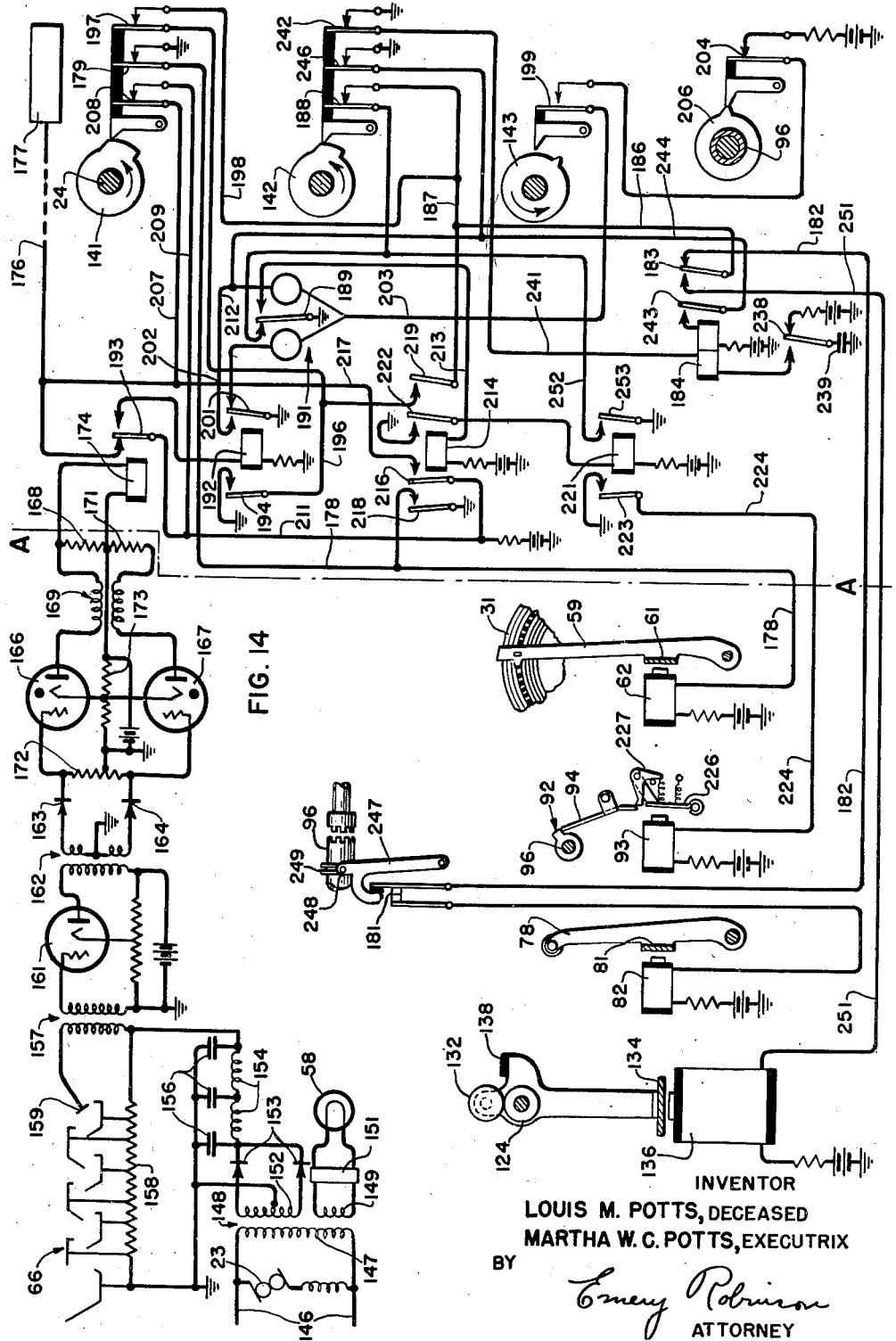
Fig. 14 is a circuit arrangement used for six unit code transmission.

The circuit arrangement for transmitting six unit code signals will now be described with particular reference to Fig. 14. Numeral 146 represents an alternating current power source which furnishes power for the motor 23 and for the primary 147 of a transformer 148. Power for the illumination of the previously identified fluorescent lamp 58 is provided from secondary 149 of transformer 148 by means of rectifier filter 151. The other secondary 152, by means of rectifiers 153, inductances 154, and condensers 156, furnish current for operation of photoamplifier tube 66 and the primary of a transformer 157. The secondary 152 of transformer 148 is tapped at its midpoint and grounded. The elements of photoamplifier tube 66 are connected to taps of a resistance 158 to provide varying potentials with the most positive potential applied to the element adjacent collector plate 159. As the code marks are scanned and light is impinged on the photoamplifier tube 66, if unprinted areas are scanned, there is a substantially uniform current in the primary of transformer 157. If all areas scanned in succession have printed code marks, again a substantially uniform current flows in the primary of transformer 157 but in this case it is of a lower value. Under either of the above steady state conditions just outlined above, no current will flow in the secondary of transformer 157. The secondary of transformer 157 is connected to the grid of tube 161, the plate of which is in series with the primary of a transformer 162. The secondary of transformer 162 is grounded at its midpoint and is associated with rectifiers 163, 164, which respectively may pass positive impulses to the grids of tubes 166, 167. The plate circuit of tube 166 is connected to positive potential through resistance 168 and one winding of commutating transformer 169, while the plate circuit of tube 167 is connected to positive potential through resistance 171 and the other winding of transformer 169. Tubes 166, 167, are gas discharge tubes and are designed to remain in the condition last assumed.

If a printed area is being scanned and during the next impulse interval an unprinted area is scanned, the value of the current flowing in the primary of transformer 157 suddenly changes inducing a voltage in the secondary of transformer 157, which is then amplified by tube 161, the amplified output of which is applied through transformer 162 to rectifiers 163 and 164 in series with grid load resistor 172. Grids of tubes 166 and 167 are normally biased negatively by means of positive battery applied through tapped resistor 173 to the cathodes, precluding tubes 166 and 167 from firing prior to a signal impulse being received from the photoelectric source.

Positive voltage impulses appearing across the secondary of transformer 162 are passed by rectifiers 163 and 164, raising the grid potential of tubes 166 or 167 to a value approximately equal to the existing positive cathode ground potential, causing the respective tube to ionize. A subsequent positive impulse on a grid of the opposite tube causes it to ionize or fire and extinguish the previously ionized tube.

It will be assumed that when passing from printed areas to unprinted areas that rectifier 164 passes current and then tube 167 will be fired. When this occurs the current set up in its associated winding sets up a current in the winding associated with tube 166 which extinguishes the latter tube. On the other hand, when passing from unprinted to printed areas, rectifier 163 passes positive potential and allows tube 166 to fire and the action of transformer 169 is to now extinguish tube 167. When printed areas are scanned, transmitter relay 174 energizes and when unprinted areas are scanned, relay 174 is de-energized. Thus, relay 174 will remain in its last operated position in accordance with the firing of gas discharge tubes 166, 167, in response to the scanning of successively opposite conditions of the page form.

As previously mentioned, cams 141, 142, and 143 are mounted on the main shaft 24 which also carries the scanning disc 31. The relationship of these cams to the scanning disc 31 is clearly shown in Fig. 6 wherein it is observable that cam 141 has a high portion which extends the whole length of the stop impulse, the high portion of cam 142 is only half as long as cam 141 and cam 143 has a small high portion which operates near the end of the stop impulse.

It will now be assumed that the transmitter is operating and relay 174 is accordingly transmitting signals over a line 176 to a distant station 177. A further assumption will be made that shaft 24 has now reached the position shown in Fig. 14. A circuit may now be traced as follows: From battery, through the winding of shutter magnet 62, over conductor 178 and through contact tongue 179 (now closed) of cam 141 to ground. With shutter magnet 62 energized, shutter 59 moves to a position to block scanning of the code marks just transmitted, unblocking the feed mark related to said last transmitted code marks. At this time, a circuit is also traceable as follows: From battery, through the winding of clutch magnet 82, through contact pair 181 (now closed), over lead 182, through tongue 183 (now on its back contact) of double wound relay 184, over leads 186, 187, through closed contact tongue 188 operable from cam 142, and through the contact tongue 189 of a polar relay 191 to ground. Contact tongue 189 is now on its left contact as will later be described. Magnet 82 is thus energized at this time and the projector 37 is accordingly advanced as was previously described in connection with the mechanical part of the invention and moves towards the next feed mark. After contact tongue 188 of cam 142 opens, the projector will have moved off the feed mark accompanying the code marks just scanned and will be scanning an unprinted area between feed marks, and relay 174 will be de-energized and relay 192 will be energized over an obvious circuit as contact tongue 193 of relay 174 falls to its back contact. The circuit for clutch magnet 82 now extends as follows: From ground, through contact tongue 194 of relay 192, over lead 196, through contact tongue 197 (still closed) of cam 141 and over lead 198 to the circuit previously described extending from lead 186 to clutch magnet 82.

As clutch magnet 82 remains energized, projector 37 continues to advance as pointed out above until the next feed mark is encountered, it being remembered that shutter 59 is at this time in its feed mark scanning position. When such a feed mark is encountered transmitter relay 174 will operate and contact tongue 193 will be drawn up to break the circuit to relay 192. Opening of contact tongue 194 of relay 192 breaks the previously described circuit for clutch magnet 82 extending through tongue 194 and the projector 37 comes to rest.

When contact tongue 199 is closed by cam 143 the projector should have reached the next feed mark, if the spacing between feed marks is normal. Under this assumed condition transmitting relay 174 will energize and relay 192 will de-energize moving its tongue 201 to its back contact as previously described and completing a circuit as follows: From ground, over lead 202, through the left winding of polar relay 191, over lead 203, and through contact tongue 199, and contact tongue 204 of cam 206 carried by carriage return sleeve 96 to battery. Under this condition contact tongue 189 will remain in the same position against the left-hand contact. What happens when abnormal spacing occurs will be explained later.

When contact 179 is opened by cam 141 to open the circuit for shutter magnet 62, the shutter 59 moves to its code mark scanning position to allow scanning disc 31 to scan the code marks of the signal code combination accompanying the feed mark which caused the advancement of projector 37 to be halted. However, the painted line previously identified as being painted beneath plate 54, adjacent slot 56 of the apparatus is scanned to first send the start or no current impulse, causing contact tongue 193 of relay 174 to move to its spacing position. During the stop impulse period, line 176 is maintained closed by a shunting circuit extending over lead 207, through contact 208 of cam 141 and over lead 209 to battery lead 211. Thus, regardless of the operation of relay 174 during the stop impulse period, line 176 is left closed. After the start impulse is transmitted the arcuate transparent areas 67—1 to 67—6 of disc 31 sequentially sweep past related openings 51—1 to 51—6 of plate 49 of the projector to sequentially scan the printed code marks and operate photoamplifier tube 66 and transmitting relay 174 accordingly. When the stop impulse position of scanning disc 31 is reached the cycle of operation described above is repeated. It will be understood that although printed characters are not printed in response to the letter space signal by the page printers described earlier in the specification, that corresponding code marks are printed with the usual feed marks for photoelectric transmission purposes.

It will now be assumed that two characters are abnormally spaced due to some defective operation. The operation in the beginning of a cycle with shaft 24 in the position shown in Fig. 14 is exactly the same. However, when contact 199 is closed, relay 192 will be energized since the projector 37 has not yet reached the next feed mark and is scanning a white area of the page form. When this occurs ground extending from contact tongue 201 of relay 192 completes a circuit over lead 212 through the right-hand winding of polar relay 191 and over lead 203 through contact 199 of cam 143 and through contact 204 of cam 206 to battery. As a result, contact tongue 189 moves against its right contact and remains in this position for an entire cycle or until contact 199 is again closed by the high portion of cam 143 after the next feed mark is reached as will be explained below. An obvious circuit is now made extending over lead 213 for relay 214. When relay 214 is energized, it pulls up its tongue 216 and places a steady marking current on line 176 over the lead 217 for a complete cycle of operations and no code signal will be transmitted during this interval. The scanning disc 31 will make its usual rotation but at this time contact tongue 218 of relay 214 will be closed to maintain shutter magnet 62 operated over lead 178. Shutter 59 thus remains in its feed mark scanning position and does not permit scanning of the code marks.

During this time, the projector continues to advance towards the next feed mark since clutch magnet 82 is now held energized over a circuit extending from ground at contact tongue 194 of relay 192 (now energized), over lead 196, through contact tongue 219 (now closed) of relay 214, over lead 187 to the previously described circuit extending over lead 186 to clutch magnet 82. However, when the next printed feed mark is scanned, relay 174 will be energized and relay 192 will be de-energized, opening contact tongue 194 and breaking the just described circuit for clutch magnet 82 bringing the projector to rest.

While shaft 24 continues to rotate after cam 143 has closed contact tongue 199, as previously described, projector 37 proceeds toward the abnormally spaced feed mark. Usually, it will find this feed mark before shaft 24 has completed another revolution and will cause clutch magnet 82 to de-energize and stop projector 37 as described above. When cam 142 closes contact 188 the original operating circuit for clutch magnet 82 cannot be completed since contact tongue 189 of polar relay 191 is still on its right-hand contact and the projector will be held at rest to scan the code combination delayed in the previous cycle. Now when contact 199 is closed immediately after, tongue 201 of relay 192 is on its back contact since the next feed mark is now being scanned and relay 174 is energized and relay 192 is de-energized. Therefore, a circuit will be completed to the left-hand winding of polar relay 191, causing the de-energization of relay 214 as contact tongue 189 moves to the left. Tongue 218 of the latter relay falls away opening the circuit of shutter magnet 62, permitting the code marks to be scanned and contact tongue 216 of the same relay falls away taking the battery off lead 217, permitting relay 174 to send the start impulse over line 176. The signal delayed by the abnormal spacing is now transmitted and normal operation continues until abnormal spacing is again encountered. On the following cycle, clutch magnet 82 may again be energized since contact tongue 189 of polar relay 191 is again on its left contact and the projector 37 may move to the next feed mark as described to scan its accompanying code marks.

Operation of the end of line mechanism for returning the projector 37 to its beginning of line position will now be explained. As the projector 37 continues to advance after scanning the last set of code marks of the line, it will scan a relatively long unprinted area. It should be mentioned at this time that when relay 214 is operated when an abnormal white feed mark is scanned, it will send a pulse to a slow-to-operate relay 221. If the unprinted area produces a pulse long enough to operate relay 192 for more than one cycle, a tongue 193 of transmitting relay 174 moves against its back contact, relay 214 will stay operated for at least two complete cycles. At this time relay 214 will pull up its tongue 216 and maintain a marking condition on line 176 as before. Furthermore, it should be mentioned that closure of tongue 218 by the same relay maintains a circuit for shutter magnet 62. Relay 214 will now stay energized long enough to enable its contact tongue 222 to operate slow-to-operate relay 221.

When slow-to-operate relay 221 is operated, a circuit is made through its contact tongue 223 and over lead 224 for the clutch magnet 93, which it will be recalled controls the operation of the carriage return mechanism. Armature 226 of clutch magnet 93 now pivots counterclockwise as viewed in Fig. 4 and carries with it latch 227 which is pivoted at 228 on armature 226 and urged clockwise by a spring 229. Nose 231 of latch 227 now engages the lower end of clutch stop arm 94 causing it to be pivoted about the points 232 in a clockwise direction against the influence of spring 233. This frees the clutch 92 for operation and gear 89 functions to drive the projector to its beginning of line position. Near the end of the movement of armature 226, latch 227 engages a fixed pin 234 which results in pivoting latch 227 counterclockwise freeing its nose 231 from the lower end of stop arm 94 and allowing the stop arm to return to its stopping position and insuring that the clutch 92 will make only a single revolution. When clutch magnet 93 is de-energized armature 226 is operated clockwise about its pivot 236 by operation of a relatively strong spring 237. At this time nose 231 will snap past the lower end of stop arm 94 and move to its original position. It is apparent then, that even though magnet 93 may remain energized, clutch 92 will permit only a single revolution of sleeve 96.

When the projector 37 reaches the beginning of line position roller 87 at the right (Fig. 4) which moves in slotted guideway 88 will operate contact bank 144 and tongue 238 associated therewith which has been in a position to enable condenser 239 to become charged. Condenser 239 now discharges through the left-hand winding of double wound relay 184, over lead 241 when contact 242 is closed by cam 142. Relay 221 is so adjusted that it operates a predetermined time after relay 214 and thus the projector will start its return movement at a fixed time. Further, the gearing will be such that projector 37 reaches the beginning of the line after shaft 24 has made a predetermined number of revolutions. As a result, contact tongue 238 is operated with shaft 24 in a predetermined angular position. Preferably, the timing is such that contact tongue 238 will move against left-hand contact just prior to the time that contact tongue 188 is closed by the high part of cam 142. When contact tongue 242 of cam 142 closes, the circuit for double wound relay 184 is made as already described. Relay 184 will now lock up through its contact tongue 243, over lead 244, and through contact tongue 246 of cam 142. When the beginning of the line was reached the margin feed mark appearing in the margin at the right of that line is scanned at this time and relay 192 will be de-energized. However, when the projector scans a white or blank area as will appear hereafter, contact tongue 201 of relay 192 will be drawn up and complete a locking circuit over lead 244 for relay 184. While the projector 37 is returning to its beginning of line position, carriage return sleeve 96 by means of U-shaped lever 247 which is provided with pins 248 resting in collar 249, opens contact pair 181 to prevent operation of clutch magnet 82 during this period.

When relay 184 is operated, a circuit is made through line feed magnet 136, over lead 251, through contact tongue 183 of relay 184 (now on its front contact), over leads 186 and 187, through closed contact 188 of cam 142, and over lead 252 to contact tongue 253 now drawn up by slow-to-operate relay 221. When the page form is fed, the projector will scan a white area existing between the outermost or margin feed mark of the line of code marks just scanned and the outermost or margin feed mark of the new line of code marks. It is at this time the locking circuit is maintained for relay 184 from contact tongue 201 of relay 192 as mentioned above. Contact tongue 218 of relay 214 is, therefore, maintaining shutter magnet 62 energized and contact tongue 216 of the same relay is maintaining condition of line 176. It should be noted that when the projector is returning to its beginning of line position, carriage return sleeve 96 rotates to open contact 204 by means of cam 206 so that regardless of the operation of relay 174, the windings of polar relay 191 cannot be pulsed and tongue 189 will remain on its right contact. Just before the carriage reaches its beginning of line position, contact 204 will close but meanwhile the high portion of cam 143 will have already operated contact 199 and operation of tongue 199 during the carriage return interval is thus ineffectual since contact 204 is open.

While the projector 37 is scanning the white area between the margin feed marks, transmitting relay 174 will be de-energized as already indicated and relay 192 will operate and pull up its contact tongue 194. This now provides a locking circuit for line feed magnet 136 which extends through contact tongue 194 of relay 192, contact tongue 219 of relay 214, and over lead 187 to lead 186, which completes the circuit to magnet 136 as before. Now even though contact 188 is opened by cam 142 to break the original circuit for line feed magnet 136, it will still remain energized. When the outermost or margin feed mark of the new line of code marks is scanned, relay 174 will operate and break the just described circuit to magnet 136 to stop the feeding of the page form in its proper scanning position. It is to be understood that the line feeding operation is completed before shaft 24 completes a single revolution. It is possible to have multiple line feeding operations as long as the line feeding operations are completed with shaft 24 in a predetermined angular position.

It should be further observed, that when the new feed mark is scanned contact tongue 201 of relay 192 opens the locking circuit for relay 184 since at this time relay 174 energizes and relay 192 de-energizes. A circuit may now be traced from battery, through clutch magnet 82, through contact pair 181, over lead 182, through tongue 183 (now on its back contact) of relay 184, over leads 186 and 187, through contact tongue 188 of cam 142 and over lead 252 to grounded contact tongue 253 of slow-to-operate relay 221. Clutch magnet 82 is therefore energized and projector 37 now starts its travel to scan the new line of code marks and after it moves a slight distance off the margin feed mark roller 87 (Fig. 4) it returns contact tongue 238 to its original position where it provides a charging path for condenser 239 for its next operation. Since contact tongue 189 of polar relay 191 is still remaining on its right-hand contact, a locking circuit will still be made over lead 213 for relay 214. Thus the projector 37 continues to advance to the feed mark accompanying the first code mark combination of the new line. However, when contact 199 is now operated by cam 143 with contact 204 closed by cam 206, contact tongue 189 of polar relay 191 will move against its left-hand contact, as the left-hand winding of polar relay 191 receives a pulse because contact tongue 201 of relay 192 is on its back contact since transmitting relay 174 is at this time energized. Thus relay 214 and slow-to-operate relay 221 will be unoperated and the circuit will be returned to normal scanning condition. It will be understood that contact 199 will be operated just after the feed mark is reached, assuming, of course, a normal spacing condition. Clutch magnet 82 is now halted in its code mark scanning position since a circuit is no longer completed through contact tongue 253 of relay 221. Further, since it is assumed that normal spacing exists between characters, relay 192 is de-energized and the abnormal spacing circuit described earlier in the specification as extending through contact tongue 194 of relay 192 and tongue 219 of relay 214 over lead 187 to lead 183, cannot be completed.

A résumé of the operation will now be given. When normal spacing exists between feed marks, after the transmission of a set of code marks has been made, clutch magnet 82 is energized and the projector 37 moves towards the next feed mark and its accompanying set of code marks with the shutter 59 in feed mark scanning position. When the next feed mark is reached, the projector 37 halts to scan its accompanying code marks with the shutter 59 in its code mark scanning position. If abnormal spacing occurs, relay 214 operates, the stop impulse to the line is prolonged and the shutter 59 is held in its feed mark scanning position, while the projector 37 continues to move toward the next feed mark and its accompanying code marks. When the next feed mark is reached the projector is halted and the code mark combination is transmitted after contact tongue 199 closes to operate the left-hand winding of polar relay 191 and thus release relay 214. When the end of the line is reached, prolonged scanning of an unmarked or white area causes relay 214 to operate slow-to-operate relay 221. Operation of relay 221 provides a circuit for energization of carriage return clutch magnet 93 which returns projector 37 to its beginning of line position. Double wound relay 184 is now operated and a circuit is completed for the line feed magnet 136 which energizes and thereby enables a new line of the page form to be scanned. The projector 37 now proceeds from the margin feed mark of the new line of code marks to the feed mark accompanying the first set of code marks to be transmitted. At this time, contact 204 operable by cam 206 of carriage return sleeve 96 will have been closed and the left-hand winding of polar relay 191 is pulsed, opening the circuit for relay 214 and returning the transmitter to normal scanning condition.

With particular reference to Figs. 7, 9, 11 and 13, which correspond to similar figures of the six unit transmitter, and to Fig. 15, a description will now be given of a five unit code transmitter which automatically inserts shift signals. It will be understood that the same transmitting apparatus, with minor changes, will be used in this case as was used in connection with the six unit transmitter.

When the five unit transmitter is to be used, a scanning disc 254 (Fig. 7) is provided on shaft 24 in place of disc 31 (Fig. 6). It will be noted that disc 254 includes a smaller transparent arcuate area 256-S which represents the shift on sixth code element of a code combination and occupies approximately one half of the start impulse area. There is no transparent area for the start or stop impulses, since such impulses are transmitted by cam operated contacts to be later identified. It will be further noted (Fig. 7) that additional cams, mounted on shaft 24 are utilized in the transmitter now being described and will be hereinafter identified. It will be further observed that shutter 257 is different from shutter 59, in that an additional aperture 258 and a projection 259 are provided for control of the shift or sixth code element of the code marks.

Reference should now be had to Fig. 15 of the drawings for the circuit arrangement of the five unit transmitter. Where parts are substantially the same as parts appearing in Fig. 14, similar numerals will be used and the description will be repeated only where necessary for a full understanding of the invention. Leads 178, 224, 182, and 257 represent similarly numbered leads extending approximately from the middle portion of the circuit appearing in Fig. 14 on the line A—A. Transmitting relay 174 is operated as before according to the scanning of the printed feed and code marks.

It will now be assumed that the five unit transmitter is in operation and that normally spaced characters in a line are being scanned. It will be further assumed that shaft 24 is in the position shown in Fig. 15. In this position a circuit for the shutter magnet 62 now extends from ground, through contact 261 of cam 262 and over lead 178 to the shutter magnet 62. At this time, therefore, shutter 257 is in its feed mark scanning position. Projector magnet 82 is energized at this time, causing the projector 37 to advance towards the next feed mark over the following circuit: From lead 182 which extends to projector magnet 82, through contact 183, now on its back contact, over lead 263, through contact tongue 264 of relay 266, through contact tongue 267 of relay 268, over lead 269, through contact 188 when closed by cam 142, over leads 271, 272 to grounded contact tongue 189 of polar relay 191 now on its left contact. After contact 188 of cam 142 is opened the circuit for magnet 82 now extends as follows: From lead 182, through tongue 183 of relay 184 as before, over leads 273, 274, through contact tongue 197, and over lead 196 to contact tongue 194 of relay 192 to ground. It should be remembered that the projector is now scanning a white area between feed marks and that relay 174 is de-energized while relay 192 is energized. When the next feed mark is reached relay 192 will de-energize and its contact tongue will fall away to break the circuit for clutch magnet 82, thereby stopping the projector. Contact tongue 261 of cam 262 will now be opened and the circuit to shutter magnet 62 will be broken to permit scanning of the new set of code marks.

In each cycle of operation, a marking or stop impulse is transmitted as follows: From battery, over leads 276, 277, through tongue 278 of cam 141, over lead 279, through make-before-break contacts 281 of double wound relay 266, through make-before-break contacts 282 of double wound relay 268, through make-before-break contacts 283 of relay 284, and over lead 286 to line 176 extending to the distant station 177. During the start impulse period contact 278 of cam 141 opens insuring that the circuit just described will be opened. Furthermore, during the start interval, contact 287 of cam 288 will open, so that independently of the condition of relay 174, the start impulse will be transmitted except when abnormal spacing occurs or during end of line operations as will hereafter appear. After the sending of the start impulse scanning disc 254 scans the five code marks and accordingly relay 174 is operated and signals are sent over the line 176. Automatic insertion of shift signals will be explained later.

At some point near the end of the stop impulse period, cam 143 will close contact 199 and send a pulse through either the left-hand or right-hand winding of polar relay 191 as described earlier in the specification in connection with the six unit code transmitter. If for some reason abnormal spacing between characters occurs, the right-hand winding of polar relay 191 receives a pulse through contact 199 and tongue 189 of relay 191 moves to its rightward position to close an obvious circuit extending over lead 187 to relay 214. When relay 214 operates steady marking current is placed on the line by a circuit extending from lead 216, over tongue 216 (now closed) of relay 214 and over lead 289 to lead 279 which extends to line 176 as previously described. Furthermore, at this time contact tongue 218 of relay 214 will be drawn up completing a circuit over lead 178 for shutter magnet 62 which holds shutter 257 in its feed mark scanning position. The projector continues to advance to the next feed mark as magnet 82 is energized over a circuit extending from contact tongue 194 of relay 192 (now energized since a white area is being scanned) over lead 196, through tongue 219 (now closed) of relay 214, over leads 274, 273, and through tongue 183 of relay 184 to lead 182 as before. As soon as a black feed mark is scanned, relay 174 will energize and relay 192 will de-energize and tongue 194 of the latter relay will break the circuit just described and stop the projector 37. Now when contact 199 of cam 143 closes, the left winding of polar relay 191 will be pulsed and the circuit of relay 214 will be broken. The line will now be freed for code mark scanning purposes and the shutter will move to its code mark scanning position. It will be noted that while the next feed mark is reached in the previous cycle that during this period the line is kept closed and the signal which had been delayed by abnormal spacing is now transmitted.

It will now be assumed that there is a prolonged scanning of a white area at the end of a line as was previously described in connection with the six unit code transmission. Relays 192 and 214 are energized at this time and when make-before-break contact 291 is operated momentarily by cam 292, a circuit may now be traced from contact tongue 293 of relay 192, through contact tongue 294 of relay 214, over lead 296, through contact 297, the operation of which will be explained later, over lead 298, and through contact 291 of cam 292 to the winding of relay 284. Relay 284 now locks up, as make-before-break contact 291 again closes, through its locking contact tongue 299. As contact tongue 301 is operated by relay 284, a circuit may be traced over lead 224 to carriage return magnet 93 and the projector is returned to its beginning of line position as described previously. When make-before-break contact tongue 283 is operated by relay 284, a carriage return transmitting contact 302 operable by a suitably notched cam 303 is placed in circuit with line 176 in a circuit extending from battery 304, through contact 302 (when closed) over lead 306, through make-before-break contact 283 now held in its operated position by relay 284 to lead 286 which extends to line 176. Thus, at this time a carriage return signal is automatically sent to distant station 177 during the first revolution of shaft 37 when the projector returns to its beginning of line position.

When the projector 37 reaches its beginning of line position, contact bank 307 is operated by a roller 87, carried by rack 84 (Fig. 4) of the transmitting apparatus, thereby moving contact bank 307 to the left. As contact 238 is moved to the left, condenser 239 discharges through the left winding of double wound relay 184 over lead 241, when the high portion of cam 142 closes contact 242. Another circuit may be established for the locking or right-hand winding of relay 184, when the margin feed mark of the line of code marks just transmitted is scanned since the projector has returned to its beginning of line position as follows: From battery, through the right-hand winding of relay 184, through contact tongue 243, over leads 244, 308, through contact tongue 201 (now against its front contact) to ground. Line feed magnet 136 is now energized over a circuit extending from lead 251, through contact tongue 183 (now on its front contact) of relay 184, through contact 188 of cam 142, over leads 271, 272 to contact tongue 309 (now closed) of bank 307.

During the line feed operation a white area will be scanned between the margin feed mark of the line just scanned and the margin feed mark of the next line to be scanned as the page form is fed upwardly. The locking circuit for relay 184 will now be made as follows: From battery, through the right-hand winding of relay 184, through its contact tongue 243, over leads 244, 311, and through contact tongue 246 when closed by cam 142 to ground. When the white area mentioned above was scanned, a new circuit for line feed magnet 136 is established which extends over lead 251, through contact tongue 183 as before, over leads 273, 274, through tongue 219 of relay 214 and over lead 196 to grounded contact tongue 194 of relay 192.

When the new margin feed mark is reached, relay 192 is released causing relay 184 to de-energize and the circuit for the line feeding operation just described is broken and the feeding of the page form ceases. The projector 37 is now ready to scan the new line of code marks. With the relay 184 de-energized and relay 194 released, a circuit for the magnet 82 is now established when contact 188 of cam 142 is closed as follows: From lead 182, through tongue 183 (now on its back contact) through contact 188, when closed by cam 142, over leads 271, 272 to grounded contact tongue 309 of bank 307. With magnet 82 energized the projector 37 now moves towards the next feed mark. After it moves a slight distance onto the white area between adjacent feed marks of the new line, contact bank 307 will be opened as roller 87 (Fig. 4) moves away and contact tongue 309 will open the just described circuit for magnet 82. However, even though opening of tongue 309 breaks the circuit for magnet 82 as described above, a circuit at this time may be traced through contact tongue 183, over leads 273, 274, through contact tongue 219 of slow-to-operate relay 214, still operated since tongue 189 of polar relay 191 is against its right contact, and over lead 196 to grounded contact tongue 293 of relay 192 now energized since a white area is being scanned. Thus, the projector 37 continues to move to the feed mark accompanying the first code mark combination of the new line. However, when contact 199 is now operated by cam 143 with contact 294 closed by cam 206, contact 189 of polar relay 191 will move against its left-hand contact as the left-hand winding of relay 191 receives a pulse completed because contact tongue 201 of relay 192 is on its back contact since transmitting relay 174 is at this time energized due to the scanning of the next feed mark. This stops advancement of the projector 37 and the first code mark combination of the new line is transmitted.

An explanation will now be given of the transmission of a figures shift signal. It will be assumed that the letters shift signal was at some time previously transmitted as will later be described. During the first half of the start impulse period, scanning disc 254 (Fig. 7) by means of transparent area 256-S scans the sixth code mark or shift area and senses a black code mark which is indicative of a figures shift condition. At this time, of course, shutter 257 (Fig. 13) places aperture 258 in its scanning position. It should be mentioned that the high portion of cam 262 retains contact 261 closed during the stop impulse period and for one-half of the start impulse period and thus during this time shutter 257 is in its feed mark or sixth code mark scanning position. During the first half of the start impulse, cam 312 closes contacts 313, 314, and since at this time the sixth code mark is being scanned, a circuit may be traced as follows: From battery, through contact tongue 316 of relay 214, over lead 317, through the left-hand winding of polar relay 318, through closed contact 313, and over lead 319 to grounded contact tongue 201 of relay 192. Contact tongue 320 of polar relay 318 previous to this has been resting on its right-hand contact tongue, and condenser 321 has been receiving a charge from battery, through the left-hand winding of relay 268, over lead 322. Contact tongue 320 now moves against its left-hand contact and condenser 321 discharges through the left-hand winding of relay 266.

Relay 266 now operates and locks up through its right-hand winding, through contact tongue 323, over leads 322 and 324, and through closed contact 326 operable by cam 327. The signal path now extends as follows: From battery 304, through transmitting contact 328 of figures shift cam 329, through make-before-break contact 281 of relay 266, now operated, through make-before-break contact 282 of relay 268, through make-before-break contact 283 of relay 284 and over lead 286 to signal line 176. It will be noted that at this time, the transmitting circuit for relay 174 which extended over lead 279 is at this time broken due to the operation of make-before-break contact 281 of relay 266 so that relay 174 cannot send signals to the line. Cam 329 now operates contact 328 and causes transmission of a figures shift signal.

During the start interval, contact 331 is opened by cam 288 and contact 328 is opened by cam 329, so that the energization of relay 266 during the start interval has no effect on start impulse transmission. Relay 266 remains operated for the entire cycle while the figures shift signal is being transmitted until cam 327 opens contact 326. During this time contact tongue 264 of relay 266 is in its attracted position and prevents travel of the projector by blocking completion of the initially described circuit for magnet 82. Just after contact 188 is closed by cam 142 and prior to the time cam 312 operates contacts 313, 314, cam 327 will operate contact 326 and break the locking circuit for relay 266 which now releases. Relay 174 now gains control of the line as make-before-break contact 281 of relay 266 moves to its unattracted position and enables transmission of the first code signals accompanying the sixth code mark which caused transmission of the figures shift signal.

When the sixth code mark is not printed, indicating a change from a figures to a letters condition, the sixth code area is scanned, and since this area is not printed relay 174 will be unoperated and relay 192 will be operated. The result of this is that when cam 312 closes contacts 313, 314, a circuit is now made from grounded contact tongue 201 of relay 192, over lead 308, through contact 314, through the right-hand winding of polar relay 318, over lead 317, and through contact tongue 316 to battery. This causes contact tongue 320 of polar relay 318 to move against its right-hand contact and charge condenser 321 through the left-hand winding of relay 268, over lead 322. As relay 268 operates, a signaling circuit is now established as follows: From battery 304, through transmitting contact 331 controlled by cam 288, through make-before-break contact 282 now attracted by relay 268, through make-before-break contact 283 of relay 284, and over lead 286 to line 176. Cam 288 now functions to send the all marking or letters shift signal to line 176 by operation of contact 331. When relay 268 operated, it locked up through its right-hand winding through contact tongue 332 and through contact 326 controlled by cam 327. Contact tongue 264 is now held attracted by relay 266 preventing the release of the projector by operation of projector magnet 82 over its initially described operating circuit. Cam 327 releases relay 268 by opening contact 326 as was described above in connection with relay 266. After the letters shift signal is transmitted, the code marks accompanying the first appearance of the letters shift characters is now transmitted. In order to prevent polar relay 318 from being operated during abnormal spacing or when the end of line is scanned, contact tongue 316 of relay 214 is attracted under such conditions. Contact 297 of contact bank 307 is opened when the projector 31 reaches its beginning of line position to prevent operation of relay 284 under such conditions so that a second carriage return signal will not be transmitted.

Continuous feed out of a page form is accomplished when the last line of a page is scanned by providing a black margin feed mark under plate 53 where plate 54 is slotted at 56. This margin feed mark would be in direct line with the margin feed marks of the page form. Thus, after the last line is scanned and the projector is returned to the beginning of line position, the line feed mechanism will continuously feed out the page form until the painted margin feed mark is scanned. A suitable alarm device could be provided to indicate that the end of the page form has been reached.

Various changes and modifications may be made in the herein described invention without departing from the spirit or scope thereof.

What is claimed is:

1. In a photoelectric transmitting apparatus, a page form supporting means adapted to receive a page form having transverse lines of code mark combinations thereon, an optical system including a pivoted projector for scanning said code marks, means for intermittently advancing said projector to scan sequentially the individual code mark combinations of a line of said code mark combinations, light sensitive means operable in accordance with the sequential scanning of said code marks by said optical system, and transmitting means associated with said light sensitive means for transmitting signals in accordance with the operation of said light sensitive means.

2. In a photoelectric transmitting apparatus, a page form supporting means adapted to receive a page form having transverse lines of code mark combinations thereon, an optical system for scanning said code marks including a pivoted projector, means for automatically varying the focal length of said projector in accordance with the area of the page form being scanned, means for intermittently advancing said projector to scan sequentially the individual code mark combinations of a line of said code mark combinations, light sensitive means operable in accordance with the sequential scanning of said code marks by said optical system, and transmitting means associated with said light sensitive means for transmitting signals in accordance with the operation of said light sensitive means.

3. In a photoelectric transmitting apparatus, a page form supporting means adapted to receive a page form having transverse lines of code mark combinations thereon, an optical system including a pivoted projector for scanning said code marks, means for intermittently advancing said projector to scan sequentially the individual code mark combinations of a line of said code mark combinations, light sensitive means operable in accordance with the sequential scanning of said code marks by said optical system, transmitting means associated with said light sensitive means for transmitting signals in accordance with the operation of said light sensitive means, means for automatically returning said projector to its beginning of line position after a line of code marks have been scanned, and means for feeding said page form to bring a new line of code marks into scanning position.

4. In a photoelectric transmitting apparatus, page form supporting means adapted to receive a page form having transverse lines of code mark combinations thereon, an optical system for scanning said code marks including a pivoted projector, a rack for driving said pivoted projector, means for intermittently operating said rack to drive said projector and thus enable said projector to scan sequentially the individual code mark combinations, light sensitive means operable in accordance with the sequential scanning of said code marks by said optical system, and transmitting means associated with said light sensitive means for transmitting signals in accordance with the operation of said light sensitive means.

5. In a photoelectric transmitting apparatus, page form supporting means adapted to receive a page form having transverse lines of code mark combinations thereon, an optical system for scanning said code marks including a pivoted projector, a rack for driving said pivoted projector, means for intermittently operating said rack to drive said projector in one direction for scanning sequentially individual code mark combinations, light sensitive means operable in accordance with the sequential scanning of said code marks by said optical system, transmitting means associated with said light sensitive means for transmitting signals in accordance with the operation of said light sensitive means, and means operative when said projector has reached an end of line position for operating said rack to thereby drive said projector in the opposite direction to its beginning of line position.

6. In a photoelectric transmitting apparatus, page form supporting means adapted to receive a page form having transverse lines of code mark combinations thereon, an optical system for scanning said code marks including a pivoted projector, a rack for driving said pivoted projector, means for intermittently operating said rack to drive said projector in one direction for scanning sequentially individual code mark combinations, light sensitive means operable in accordance with the sequential scanning of said code marks by said optical system, transmitting means associated with said light sensitive means for transmitting signals in accordance with the operation of said light sensitive means, means responsive when said projector has reached an end of line position for operating said rack to thereby drive said projector in the opposite direction to its beginning of line position, and line feed means operative when said projector has reached its beginning of line position for advancing a page form to bring a new line of code marks into scanning position.

7. In a photoelectric transmitting apparatus, a page form supporting means adapted to receive a page form having transverse lines of code mark combinations thereon, an optical system including a pivoted projector for scanning said code marks, means including a clutch for intermittently advancing said projector to scan sequentially the individual code mark combinations of a line of said code mark combinations, light sensitive means operable in accordance with the sequential scanning of said code marks by said optical system, and transmitting means associated with said light sensitive means for transmitting signals in accordance with the operation of said light sensitive means.

8. In a photoelectric transmitting apparatus, page form supporting means adapted to receive a page form having transverse lines of code mark combinations thereon, an optical system for scanning said code marks including a pivoted projector, a rack for driving said pivoted projector, means including a clutch for intermittently operating said rack to drive said projector and thus enable said projector to scan sequentially the individual code mark combinations, light sensitive means operable in accordance with the sequential scanning of said code marks by said optical system, and transmitting means associated with said light sensitive means for transmitting signals in accordance with the operation of said light sensitive means.

9. In a photoelectric transmitting apparatus, page form supporting means adapted to receive a page form having transverse lines of code mark combinations thereon, an optical system for scanning said code marks including a pivoted projector, a rack for driving said pivoted projector, means including a clutch for intermittently operating said rack to drive said projector in one direction for scanning sequentially individual code mark combinations, light sensitive means operable in accordance with the sequential scanning of said code marks by said optical system, transmitting means associated with said light sensitive means for transmitting signals in accordance with the operation of said light sensitive means, and means including a clutch operative when said projector has reached an end of line position for operating said rack to thereby drive said projector in the opposite direction to its beginning of line position.

10. In a photoelectric transmitter, control form supporting means for supporting a control form having indicia thereon, a light sensitive device, a movable projector including a lens system for projecting sequentially images of said indicia from different areas of a control form to said light sensitive device to thereby operate said light sensitive device, means for automatically varying the focal length of said lens system in accordance with the distance through which an image is projected from a particular area of said control form to said light sensitive device, and transmitting means associated with said light sensitive device to transmit signals in accordance with the operation of said light sensitive device.

11. In a photoelectric transmitter, page form supporting means adapted to receive a page form having transverse lines of code mark combinations thereon, an optical system including a movable projector for scanning said code mark combinations, a rack on which said projector is moved, means for moving said projector on said rack step by step from one code combination to another to scan sequentially the individual code combinations, a light sensitive device operable by said optical system, and transmitting means operable under the control of said light sensitive device for transmitting signals representative of the code marks scanned by said optical system.

12. In a photoelectric transmitter, page form supporting means adapted to receive a page form having transverse lines of code mark combinations and an individual feed mark for each code mark combination thereon, and optical system including a pivoted projector for scanning said code mark combinations and said feed marks, means for advancing said projector step by step from one code mark combination to another to scan the individual code mark combination, a light sensitive device operable by said optical system, said projector being stopped in its step by step advancement at each code combination in response to the scanning of a feed mark by said optical system, and transmitting means operable under the control of said light sensitive device for transmiting signals representative of the code marks scanned by said optical system.

13. In a photoelectric transmitter, page form supporting means adapted to receive a page form having transverse lines of code mark combinations, an individual feed mark for each code combination and a margin feed mark for each line of code marks, an optical system including a movable projector for scanning said code marks and said feed marks, means for advancing said projector step by step from one code mark combination to another, means for enabling the sequential scanning of the individual code marks of the combinations by said optical system, light sensitive means operable by said optical system in response to the scanning of said code marks and said feed marks, said projector being stopped in its step by step advancement at each code combination in response to the scanning of a feed mark by said optical system, transmitting means operable under the control of said light sensitive device for transmitting signals representative of the code marks scanned by said optical system, means for automatically returning said projector to its beginning of line position after a line of code marks have been scanned, line feed means operative when said projector has reached its beginning of line position for advancing said page form, and means for disabling said line feed means when the margin feed mark of the next line of code marks is scanned by said optical system.

14. In a photoelectric transmitting apparatus, a page form supporting means adapted to receive a page form having transverse lines of code mark combinations thereon including a shift control mark, an optical system including a movable projector for scanning said code marks and shift control mark, means for advancing said projector across said page form to scan sequentially the individual code mark combinations, light sensitive means operable in accordance with the sequential scanning of said code marks by said optical system, transmitting means associated with said light sensitive means for transmitting signals in accordance with the operation of said light sensitive means, means responsive to the scanning of the presence of said shift mark for automatically transmitting one type of shift signal, and means responsive to the scanning of the absence of said shift mark for automatically transmitting another type of shift signal.

15. In a photoelectric transmitting apparatus, page form supporting means adapted to receive a page form having transverse lines of six unit code mark combinations, an optical system for sequentially scanning the individual marks of each code combination including a movable projector, means for advancing said projector step by step from one code mark combination to another, light sensitive means operable in accordance with the sequential scanning of said code mark combinations by said optical system, transmitting means associated with said light sensitive means for transmitting five unit code signals in accordance with the operation of said light sensitive means, means operable in response to the scanning of a sixth code mark by said optical system for automatically transmitting one type of shift signal, and means operable in response to the failure of said optical systems to scan a sixth mark for automatically transmitting another type of shift signal.

16. In a photoelectric transmitter, page form supporting means adapted to receive a page form having transverse lines of code mark combinations, an optical system including a movable projector for scanning said code mark combinations, a rack on which said projector is moved, means for moving said projector on said rack step by step from one code combination to another to scan sequentially the individual code combinations, light sensitive means operable by said optical system, transmitting means operable under the control of said light sensitive means for transmitting signals representative of the code marks scanned sequentially by said optical system, and means for automatically transmitting an end of line signal when said optical system has completed the transmission of a line of code mark combinations.

17. In a photoelectric transmitter, page form supporting means adapted to receive a page form having transverse lines of code mark combinations thereon, an optical system including a movable projector for scanning code mark combinations, means for moving said projector step by step from one code combination to another to scan sequentially the individual code combinations, light sensitive means operable by said optical system, transmitting means operable under the control of said light sensitive means for transmitting signals representative of the code mark combinations scanned sequentially by said optical system, and means for automatically providing a start and stop signal to accompany each group of code mark combination signals transmitted.

18. In a photoelectric transmitting apparatus, page form supporting means adapted to receive a page form having transverse lines of code mark combinations and a feed mark individual to each code combination recorded thereon, an optical system for scanning said code and feed marks including a movable projector, means for moving said projector step by step from one code combination to another to scan sequentially the individual code mark combinations, light sensitive means operable by said optical system, the travel of said projector being halted in each step by step movement by the scanning of a feed mark, transmitting means operable under the control of said light sensitive means for transmitting signals representative of the code mark combinations scanned sequentially by said optical system, means for automatically providing a start and stop signal to accompany each group of code mark combination signals transmitted, and means for prolonging said stop impulse beyond the normal duration while said projector is traveling from one feed mark to another until the new feed mark is scanned.

19. In a photoelectric transmitting apparatus, page form supporting means adapted to receive a page form having transverse lines of code marks and spaced feed marks individual to each code mark combination thereon, an optical system including a movable projector, means for moving said projector step by step from one code combination to another to scan sequentially the individual code mark combinations, light sensitive means operable in accordance with the sequential scanning of said code and feed marks by said optical system, transmitting means associated with said light sensitive means for transmitting signals in accordance with the operation of said light sensitive means, means operable in response to the scanning of a feed mark for halting said projector in its step by step movement at its accompanying code mark combination to scan said code mark combination, and means responsive to the scanning of a blank area beyond a fixed limit of time by said optical system at the end of a line for automatically returning said projector to its beginning of line position.

20. In a photoelectric transmitter, page form supporting means having transverse rows of code mark combinations thereon, means for scanning said rows of code marks, means for feeding said page form to place a new row of code marks in scanning position after the previous row has been scanned, and means controlled by said scanning means for continuously feeding said page form after the last row of code marks have been scanned.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
| --- | --- | --- |
| 1,605,222 | Deses et al. | Nov. 2, 1926 |
| 2,036,128 | Finch | Mar. 31, 1936 |
| 2,183,559 | Green | Dec. 19, 1939 |
| 2,274,737 | Potts | Mar. 3, 1942 |